United States Patent
Goebel et al.

(10) Patent No.: US 11,888,186 B2
(45) Date of Patent: Jan. 30, 2024

(54) INTEGRATED PLATE AND CELL SEALING

(71) Applicant: HYZON MOTORS INC., Honeoye Falls, NY (US)

(72) Inventors: Steve Goebel, Victor, NY (US); Gary M. Robb, Honeoye Falls, NY (US)

(73) Assignee: HYZON MOTORS INC., Honeoye Falls, NY (US)

( * ) Notice: Subject to any disclaimer, the term of this patent is extended or adjusted under 35 U.S.C. 154(b) by 175 days.

(21) Appl. No.: 17/459,217

(22) Filed: Aug. 27, 2021

(65) Prior Publication Data

US 2022/0069319 A1     Mar. 3, 2022

Related U.S. Application Data

(60) Provisional application No. 63/071,476, filed on Aug. 28, 2020.

(51) Int. Cl.
| | |
|---|---|
| *H01M 8/0254* | (2016.01) |
| *H01M 8/0267* | (2016.01) |
| *H01M 8/1006* | (2016.01) |
| *H01M 8/0273* | (2016.01) |
| *H01M 8/026* | (2016.01) |

(52) U.S. Cl.
CPC ......... *H01M 8/0254* (2013.01); *H01M 8/026* (2013.01); *H01M 8/0267* (2013.01); *H01M 8/0273* (2013.01); *H01M 8/1006* (2013.01)

(58) Field of Classification Search
CPC .. H01M 8/0254; H01M 8/026; H01M 8/0267; H01M 8/0273; H01M 8/1006; H01M 8/1004; Y02E 60/50; Y02P 70/50
See application file for complete search history.

(56) References Cited

U.S. PATENT DOCUMENTS

| | | |
|---|---|---|
| 6,974,648 B2 | 12/2005 | Goebel |
| 7,029,784 B2 | 4/2006 | Carlstrom |
| 7,291,414 B2 | 11/2007 | Goebel et al. |
| 7,687,175 B2 | 3/2010 | Abd Elhamid et al. |
| 8,371,587 B2 | 2/2013 | Fly et al. |
| 2010/0015505 A1 | 1/2010 | Miller et al. |
| 2010/0129725 A1 | 5/2010 | Roy et al. |
| 2019/0036130 A1 | 1/2019 | Jilani |
| 2021/0226227 A1 | 7/2021 | Gu |

FOREIGN PATENT DOCUMENTS

WO      2020/073238 A1      4/2020

OTHER PUBLICATIONS

Written Opinion of the International Search Authority dated Dec. 2, 2021.

*Primary Examiner* — Helen Oi K Conley
(74) *Attorney, Agent, or Firm* — Jacob M. Ward; Ward Law Office LLC

(57) ABSTRACT

A bipolar plate assembly includes a first frame member, a second frame member, and a membrane electrode assembly. The first frame member has a first side and a second side. The first side has a first side protuberance. The second frame member includes a first side and a second side. The second side has a second side recess. The membrane electrode assembly has an anode plate and a cathode plate. A portion of the membrane electrode assembly is disposed between the first frame member and the second frame member. The portion of the membrane electrode assembly has a juxtaposition of the anode plate and the cathode plate. The first side protuberance of the first frame member deforms the portion of the membrane electrode assembly into the second side recess of the second frame member.

20 Claims, 8 Drawing Sheets

INTEGRATED PLATE AND CELL SEALING

CROSS-REFERENCE TO RELATED APPLICATIONS

This application claims the benefit of U.S. Provisional Application. No. 63/071,476, filed on Aug. 28, 2020. The entire disclosure of the above application is hereby incorporated herein by reference.

FIELD

The present technology relates to sealing of bipolar plates in conjunction with fuel cells, particularly where frame members are used to cooperatively seal bipolar plates, including metal bipolar plates and hybrid bipolar plates.

INTRODUCTION

This section provides background information related to the present disclosure which is not necessarily prior art.

A fuel cell has been proposed as a clean, efficient, and environmentally responsible power source for various industries, including manufacturing centers, homes, and electric vehicles, among other applications. One example of a fuel cell is a proton exchange membrane fuel cell (PEMFC). The PEMFC can include a membrane-electrode-assembly (MEA) that can have a proton exchange membrane (PEM) disposed between two electrodes (e.g., anode and a cathode) each having a catalyst. The MEA can be generally sandwiched between a pair of porous conductive materials, also known as gas diffusion media, which distribute gaseous reactants, for example, hydrogen and oxygen or air, to the electrode layers. A hydrogen reactant can be introduced at the anode where it reacts electrochemically in the presence of the catalyst to produce electrons and protons. The electrons can be conducted from the anode to the cathode through an electrical circuit disposed therebetween. Simultaneously, the protons pass through the proton exchange membrane to the cathode where an oxidant, such as oxygen or air, reacts electrochemically in the presence of catalyst to produce oxygen anions. The oxygen anions react with the protons to form water as a reaction product. The MEA of the PEMFC can be sandwiched between a pair of electrically conductive bipolar plates which serve as current collectors for the anode and cathode.

A bipolar plate can be configured as conductive plate in a fuel cell stack that can function as an anode plate for one fuel cell and a cathode plate for an adjacent fuel cell. The bipolar plate can include metal and/or a conductive polymer, e.g., a carbon-filled composite. The bipolar plate can incorporate various lands and channels forming flow fields for reactant fluids and can also contain internal conduits for a coolant flow field. In this way, the bipolar plate can contain and direct fluids into, within, and out of the fuel cell, and distribute fluids to fuel cell areas necessary for operation. Bipolar plates can further provide structural support for diffusion media, membranes, seals, etc., enable sealing from one fuel cell to the next, can conduct heat formed by reactions within the fuel cell, and importantly also conduct electricity generated by the fuel cell reactions. The bipolar plates can serve as electrical conductors between a series of adjacent fuel cells assembled in a fuel cell stack.

Certain bipolar plates include a joined assembly constructed from two separate unipolar or half plates. Each half plate may have an exterior surface with flow channels for the gaseous reactant fluids and an interior surface with the coolant channels. In order to conduct electrical current between the anodes and cathodes of adjacent fuel cells in the fuel cell stack, the paired half plates forming each bipolar plate assembly are mechanically and electrically joined. For example, such bipolar plates are commonly constructed having the pair of half plates joined by adhesive seal, by brazing, or by welding.

It is known to form bipolar plates from either carbon composite materials or metallic metals. Each approach has advantages and limitations. Nested composites are described by U.S. Pat. No. 7,029,784 to Carlstrom. Nested stamped metal and non-nested composite and stamped metal bipolar plates are described by U.S. Pat. No. 6,974,648 to Goebel and U.S. Pat. No. 7,687,175 to Abd Elhamid et al., respectively. Feed region support for nested plates is described by U.S. Pat. No. 7,291,414 to Goebel. Other examples include hybrid bipolar plates, as described by U.S. patent application Ser. No. 16/093,890 to Gu, filed on Oct. 15, 2018. The entire disclosures of these documents are incorporated herein by reference.

Bipolar plates can require sealing between each half cell, which can be referred to as plate sealing, as well as sealing between the fuel cell assemblies, which can be referred to as cell sealing. Plate sealing can be accomplished using laser welding with metal plates or adhesive bonding with composite plates, for example. Cell sealing can be accomplished by dispensing and curing an elastomeric seal on the plate or injection molding on the MEA, for example. Such sealing processes add time and cost to the manufacturing process of the bipolar plates and cells. Accordingly, there is a need for improved ways of sealing bipolar plates in the assembly of a fuel cell and fuel cell stacks.

SUMMARY

In concordance with the instant disclosure, improved ways of sealing bipolar plates in the assembly of a fuel cell and fuel cell stacks have been surprisingly discovered.

The present technology includes articles of manufacture, systems, and processes that relate to sealing of bipolar plates, including metal bipolar plates and hybrid bipolar plates, that can be used in conjunction with forming fuel cells and fuel cell stacks, where frame members and bipolar plates can form one or more cooperative seals therebetween.

Ways of making, forming, and using, a bipolar plate assembly for a fuel cell are provided, where the bipolar plate assembly includes a first frame member, a second frame member, a bipolar plate, and a membrane electrode assembly. The first frame member can include a first side and a second side, where the first side has a first side protuberance. The second frame member can include a first side and a second side, where the second side has a second side recess. The bipolar plate can include an anode plate and a cathode plate, where a portion of the anode plate and a portion of the cathode plate are disposed between the first frame member and the second frame member. The membrane electrode assembly can include a proton exchange membrane disposed between an anode catalyst layer and a cathode catalyst layer, where the membrane electrode assembly can be disposed adjacent one of the anode plate and the cathode plate of the bipolar plate. The first side protuberance of the first frame member deforms the portion of the anode plate and the portion of the cathode plate into the second side recess of the second frame member forming a seal therebetween.

The bipolar plate assembly can include various additional aspects. The first frame member can include a second side recess and the second frame member can include a first side protuberance. The first frame member can include a first side recess and the second frame member can include a second side protuberance. The first frame member can include a second side protuberance and the second frame member can include a first side recess. In this way, embodiments can include where the second side protuberance of the second frame member deforms the portion of the anode plate and the portion of the cathode plate into the first side recess of the first frame member, thereby forming another seal therebetween. The first side protuberance and the first side recess of each of the first frame member and the second frame member can be laterally offset from each other. Likewise, the second side recess and the second side protuberance of each of the first frame member and the second frame member can be laterally offset from each other. Certain embodiments of the bipolar plate assembly can include where the first frame member and the second frame member have substantially the same structure.

The frame members of the bipolar plate assembly can include various additional aspects. One or both of the first frame member and the second frame member can be electrically nonconductive. Likewise, one or both of the first frame member and the second frame member can comprise a plastic material. The first side protuberance of the first frame member can be deformed in forming the seal. The first side protuberance of the first frame member can have one of a substantially trigonal cross-section and a substantially frustoconical cross-section. Certain embodiments include where the first side protuberance of the first frame member has a substantially trigonal cross-section that is deformed toward a substantially frustoconical cross-section in forming the seal.

Alternative ways of making, forming, and using, a bipolar plate assembly for a fuel cell are provided, where the bipolar plate assembly includes a first frame member, a second frame member, a bipolar plate, and a membrane electrode assembly. The first frame member can include a first side and a second side, where the first side can have a first side protuberance and a first side recess. The second frame member can include a first side and a second side, where the second side can have a second side recess and a second side protuberance. The bipolar plate can include an anode plate and a cathode plate, where a portion of the cathode plate can be disposed between the first frame member and the second frame member. The membrane electrode assembly can include a proton exchange membrane disposed between an anode catalyst layer and a cathode catalyst layer, the membrane electrode assembly can be disposed adjacent one of the anode plate and the cathode plate of the bipolar plate, and a portion of the proton exchange membrane can be disposed between the first frame member and the second frame member. The first side protuberance of the first frame member can deform the portion of the proton exchange membrane and the portion of the cathode plate into the second side recess of the second frame member, thereby forming a seal therebetween. The second side protuberance of the second frame member can deform the portion of the cathode plate and the portion of the proton exchange membrane into the first side recess of the first frame member, thereby forming another seal therebetween.

Such alternative embodiments of bipolar plate assembly for a fuel cell can include additional aspects. The first side protuberance of the first frame member can contact and deform the portion of the proton exchange membrane, which can contact and deform the portion of the cathode plate into the second side recess of the second frame member, thereby forming the seal therebetween. The second side protuberance of the second frame member can contact and deform the portion of the cathode plate, which can contact and deform the portion of the proton exchange membrane into the first side recess of the first frame member, thereby forming the another seal therebetween. The first frame member can include an anode channel fluidly coupling an anode header and an anode flow field positioned between the anode plate and the anode catalyst layer. The second frame member can include a cathode channel fluidly coupling a cathode header and a cathode flow field positioned between the cathode plate and the cathode catalyst layer, wherein the cathode plate includes an aperture between the seal and the another seal that cooperates with the cathode channel in fluidly coupling the cathode header and the cathode flow field.

The bipolar plate assemblies, as provided herein, can be used in various fuel cells, fuel cell stacks, and fuel cell stack assemblies. Such fuel cells, stacks, and assemblies can be used to provide electrical energy to various systems and devices, including various electrical motors including those used to power electric and/or hybrid vehicles. Methods of assembling such bipolar plate assemblies are also provided.

The present technology can thereby make use of integral frame features that can be included in the forming process of the bipolar plates and/or frame members. These features can provide a sealing surface and deform or deflect the bipolar plates during compression of a resulting fuel cell stack. This can be further accomplished by adding features to the formed cathode plate half for a hybrid plate or with a separate frame for an all-metal plate design.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
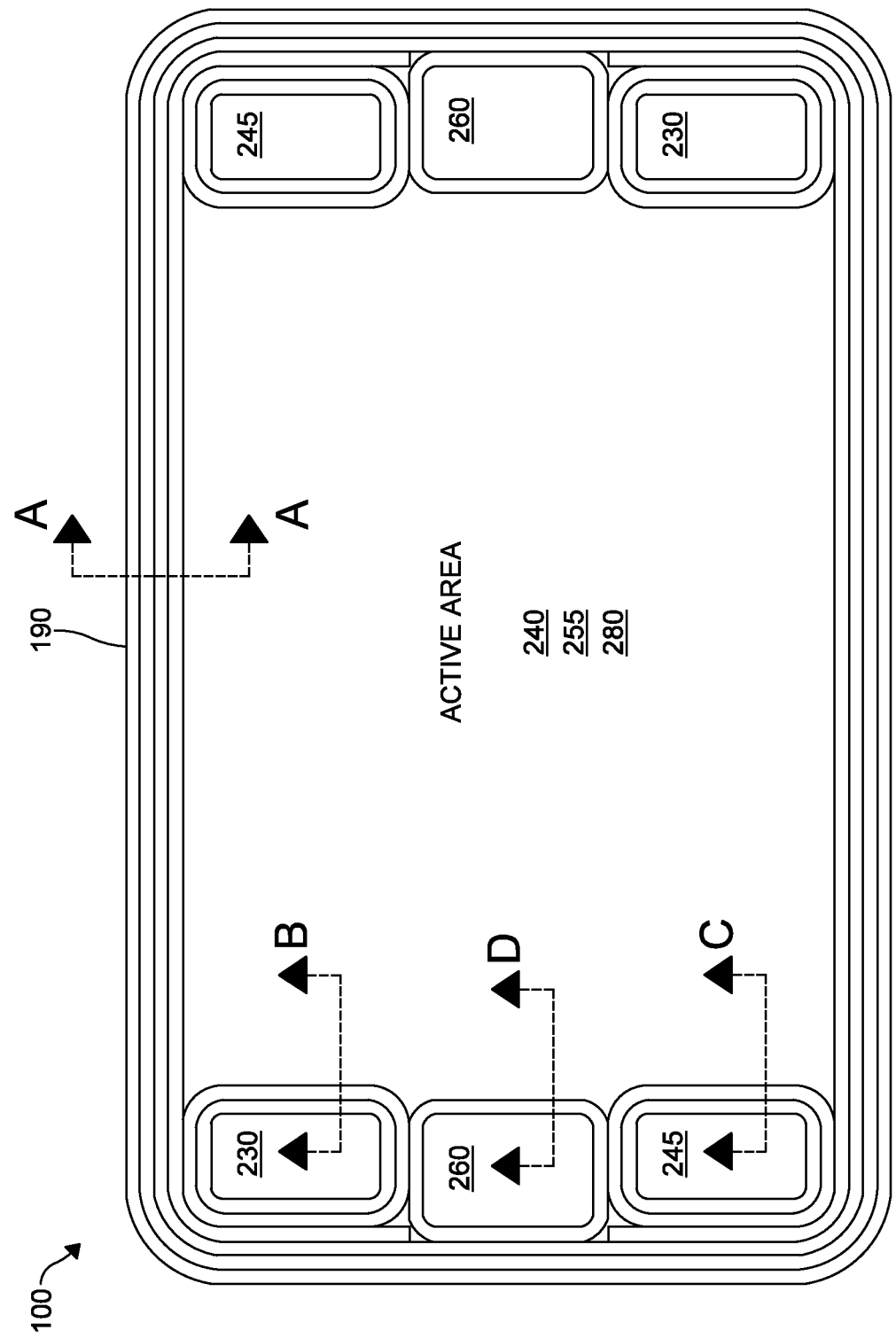
FIG. 1 is a schematic top plan view of a bipolar plate assembly showing locations of anode, cathode, and coolant headers with respect to an active area of the fuel cell, constructed in accordance with the present technology.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology is drawn to ways of making and using bipolar plate assemblies that provide one or more sealing functions between components of the bipolar plate assembly, which can work in conjunction with anode fluid, cathode fluid, and/or coolant fluid distribution through the assembly. Particular frame member configurations provide one or more cooperating protuberances and recesses that deform portions of an anode plate, cathode plate, and/or proton exchange membrane and provide sealing functions relative thereto. Each frame member can circumscribe an active area of the fuel cell and provide specialized sealing functions relative to certain regions of the bipolar plate assembly, including edges of the bipolar plate assembly, as well as at anode, cathode, and/or coolant fluid headers of the bipolar plate assembly. Protuberances and/or recesses of the frame members can be resilient and can be deformed relative to each other. The protuberances and/or recesses, however, can be more rigid than portions of the anode plate, cathode plate, and/or proton exchange membrane contacted thereby. This can allow the protuberance and/or recesses to deform the anode plate, cathode plate, and/or proton exchange membrane, and at least partially conform the anode plate, cathode plate, and/or proton exchange membrane to the protuberance and/or recess. Sandwiching and sealing of the anode plate, cathode plate, and/or proton exchange membrane between a protuberance/recess of one frame member and a recess/protuberance of another frame member can be repeated in one or more laterally offset locations of the frame members as well as on opposing sides of the frame members.

The present technology accordingly provides integral frame member features that can be included in the forming process of the bipolar plate and/or frame. These features provide a sealing surface and deflect portions of the bipolar plate during compression of the fuel cell stack. This can be accomplished by adding certain features to a formed cathode plate half for a hybrid plate or with a separate frame for an all-metal plate design.

In certain embodiments, a bipolar plate assembly is provided that includes a first frame member, a second frame member, a bipolar plate, and a membrane electrode assembly. The first frame member includes a first side and a second side, the first side having a first side protuberance. The second frame member includes a first side and a second side, the second side having a second side recess. The bipolar plate includes an anode plate and a cathode plate, a portion of the anode plate and a portion of the cathode plate being disposed between the first frame member and the second frame member. The membrane electrode assembly includes a proton exchange membrane disposed between an anode catalyst layer and a cathode catalyst layer, where the membrane electrode assembly is disposed adjacent one of the anode plate and the cathode plate of the bipolar plate. The first side protuberance of the first frame member deforms the portion of the anode plate and the portion of the cathode plate into the second side recess of the second frame member to form a seal therebetween.

The frame members can further include various aspects. Regarding one or more protuberances and one or more recesses of the frame members, the first frame member can include a second side recess and the second frame member can include a first side protuberance. The first frame member can include a first side recess and the second frame member can include a second side protuberance. The first frame member can include a second side protuberance and the second frame member can include a first side recess. In certain embodiments, the first frame member and the second frame member can have substantially the same structure. In this way, the multiple frame members can be stacked with multiple fuel cell components to form multiple sealed bipolar plates in forming a fuel cell stack.

Where the first frame member further includes a first side recess and the second frame member further includes a second side protuberance, the second side protuberance of the second frame member can deform the portion of the anode plate and the portion of the cathode plate into the first side recess of the first frame member, thereby forming another seal therebetween. One or more seals can therefore be formed at various points on the portions of the anode plate, cathode plate, and/or proton exchange membrane that are disposed between the first frame member and the second frame member. The number and nature of the seals can be particular to certain regions of the bipolar plate assembly, including edges of the bipolar plate assembly, as well as at anode, cathode, and/or coolant fluid headers of the bipolar plate assembly.

Frame members can include or be entirely formed of various materials. For example, one or more frame members can be electrically nonconductive. In this way, the nonconductive frame member can minimize undesired electrical pathways in the bipolar plate assembly and can improve and maintain proper electrical current within the resulting fuel cell and fuel cell stack. Frame members can also include plastic as well as exhibit plastic character, where the frame material can be shaped and molded by various processes. In this way, one or more protuberances of the frame member can be deformed in forming one or more seals. Protuberances can have one of a substantially trigonal cross-section and a substantially frustoconical cross-section. Likewise, one or more recesses of the frame member can be deformed in forming one or more seals. Deformation of a protuberance (optionally along with deformation of a cooperating recess)

can therefore result in a protuberance having a substantially trigonal cross-section being deformed toward a substantially frustoconical cross-section. The protuberances can have other cross-sectional shapes, as desired, where the recesses can be tailored to be complementary and work in conjunction with the protuberances to provide the desired sealing functions.

With further respect to the various protuberances and recesses, in certain embodiments a sealant can be disposed between the protuberance of the frame member and the deformed portion of the membrane electrode assembly, the recess of the frame member and the deformed portion of the membrane electrode assembly, or both the protuberance of the frame member and the deformed portion of the membrane electrode assembly and the recess of the second frame member and the deformed portion of the membrane electrode assembly. Examples of sealants include various sealants used in fuel cells to provide fluid-tight seals. The sealant can include various hot melt adhesives as well as various pressure sensitive adhesives. Various silicone sealants can be used. In certain embodiments, the protuberances and recesses of the frame members can obviate the need to use a sealant, including where a protuberance and/or recess contacts and deforms the anode plate or the cathode plate of the bipolar plate.

Frame members can be configured in various ways. For example, one or more frame members can include a plurality of edges, an anode header, a cathode header, and/or a coolant header. Each edge can be substantially congruent with an edge of the bipolar plate assembly. Each of the anode header, cathode header, and the coolant header can include inlet and outlet headers. For example, the anode header can include an inlet header for a cathode fluid that is then directed through a cathode flow filed across an active area of the fuel cell and then exhausted through an outlet header. Each header can include one or more channels connecting the respective inlet/outlet to the flow field. Flow fields can include various types of flow fields used to distribute reactant fluids (e.g., hydrogen at the anode and oxygen/air at the cathode) across the active area of the fuel cell that includes the membrane electrode assembly. Frame members can be substantially congruent with a perimeter of the bipolar plate assembly, where the frame member substantially circumscribes the membrane electrode assembly, and the anode catalyst layer and the cathode catalyst layer of the membrane electrode assembly are disposed within an open interior portion of the frame member.

Frame members can have one or more fluid channels therethrough. Examples of fluid channels include one or more anode fluid channels, one or more cathode fluid channels, and one or more coolant fluid channels. Each anode channel can fluidly couple an anode header and an anode flow field positioned between the anode plate and the anode catalyst layer. Each cathode channel can fluidly couple a cathode header and a cathode flow field positioned between the cathode plate and the cathode catalyst layer. A coolant flow field can fluidly couple a coolant header and a coolant flow field in thermal communication with the anode plate or the cathode plate. For example, one coolant flow field can fluidly couple the coolant header and a coolant flow field in thermal communication with the anode plate and another coolant flow field can fluidly couple the coolant header a coolant flow field in thermal communication with the cathode plate.

As provided herein, the frame members can include various numbers of protuberances and/or recesses on one or both sides, including where the number and type of protuberances and/or recesses changes depending on the location within the bipolar plate assembly and within a resulting fuel cell stack. For example, the frame members can provide protuberances and recess that work in conjunction with channels for fluid distribution, e.g., anode, cathode, and coolant fluids. Each frame member can be generally configured as a loop, where the frame is positioned around corresponding plate areas, e.g., edge of frame around perimeter, and each fluid channel frame around its respective header.

A seal formed by pressure between a protuberance and a recess can take into account the thickness of respective anode and/or cathode plates, as well as when a proton exchange membrane is disposed therebetween. Where the anode plate and/or the cathode plate is metal, the metal plate can bend when deformed by the protuberance and/or recess and accordingly can conform to at least a portion of the protuberance and/or recess structure. The proton exchange membrane can likewise have a rigidity such that deformation by the protuberance and/or recess can result in the membrane conforming to at least a portion of the protuberance and/or recess structure. It is further possible that the anode plate, the cathode plate, and/or the proton exchange membrane can exhibit plasticity or malleability in forming the seal with the pressure applied by the protuberance and recess.

Different portions of the bipolar plate assembly can also include separate frame members. For example, an edge frame member can be used at the edge portions of the bipolar plate assembly, circumscribing or following a periphery of the bipolar plate assembly. An anode header frame member can be used adjacent an anode header of the bipolar plate assembly. A cathode header frame member can be used adjacent a cathode header of the bipolar plate assembly. A coolant header frame member can be used adjacent a coolant header of the bipolar plate assembly. Such separate frame members can be used in conjunction with each other, including where such frame members are successively stacked, received therein, or layered relative to each other to form a fuel cell stack. Alternatively, the frame member can have different features molded therein at different regions to accommodate particular locations of the bipolar plate assembly, e.g., integrated anode header, cathode header, and coolant header portions within a single frame member.

In certain embodiments, the frame members can be configured to work with micro-channel technology (MCT) on a cathode of a membrane electrode assembly. The term "micro-channel" refers to very fine flowfield features. The MCT material can include a composite material that is extruded in a continuous fashion. To provide the remainder of the features necessary for sealing and fluid headers, a plastic frame member can be used. The plastic frame member can be bonded (e.g., via thermal fusing) to an extruded MCT insert for sealing. The frame member can also include features to provide desired flow channels. It is considered that the frame member can be manufactured by compression molding of a sheet of plastic. A stamped metal plate can be used for the anode. Flexure of a metal plate across sealing protrusions and recesses of the frame member can providing the requisite sealing. This can be advantageous over conventional elastomer seals or plate welding due to the cycle time.

EXAMPLES

Particular examples of the bipolar plate assembly are provided hereafter relative to certain portions of the bipolar plate assembly and/or relative to certain components of the bipolar plate assembly. An example plan view of a bipolar plate assembly 100 is shown in FIG. 1. It should be understood, however, that one skilled in the art can recognize and employ different shapes, layouts, sizes, proportions, types, and numbers of components for the bipolar plate assembly 100 based upon the guidance provided by these examples.

Figure 2:
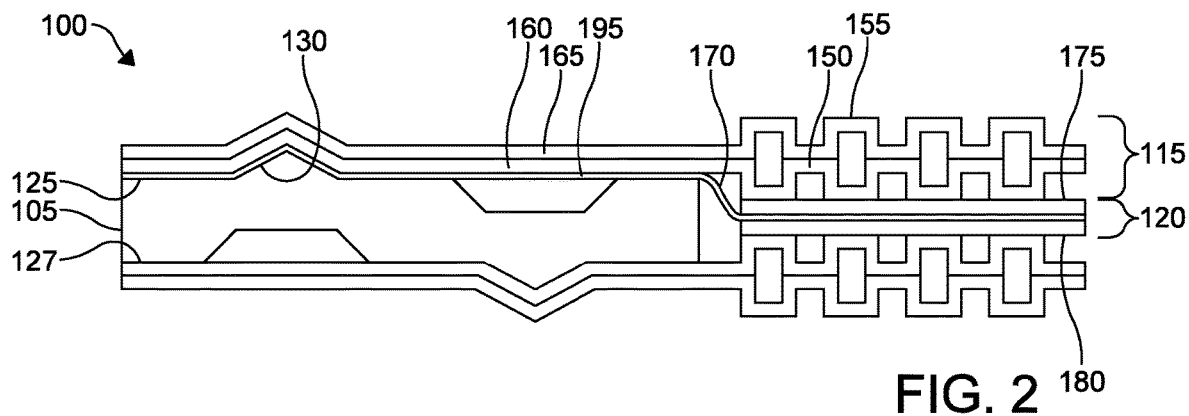
FIG. 2 is a partial cross-sectional view of an edge of the bipolar plate assembly taken along line A-A in FIG. 1.
Figure 3:
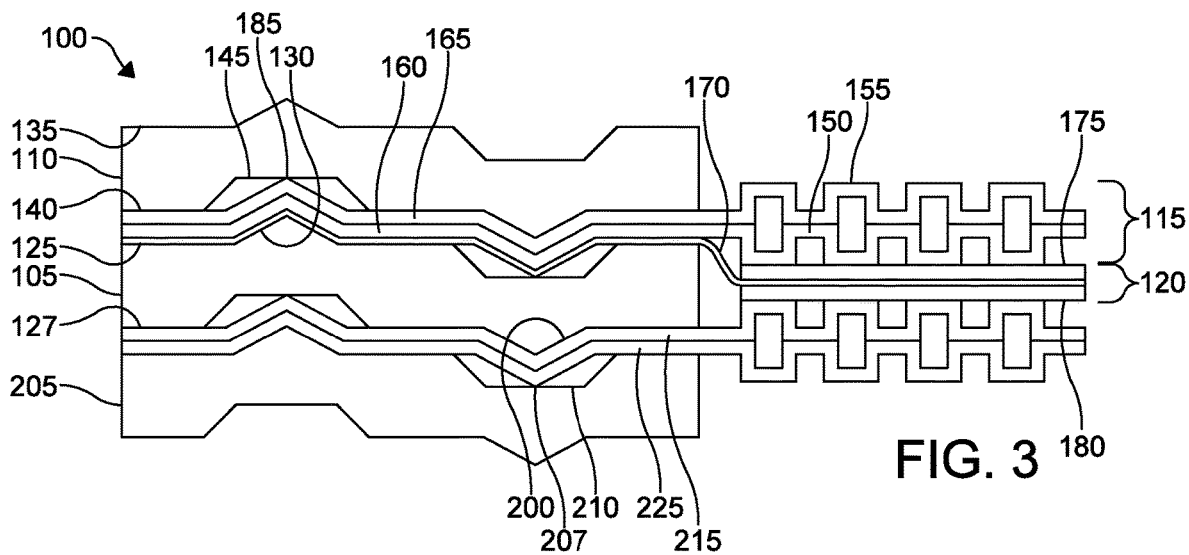
FIG. 3 is another partial cross-sectional view of an edge of the bipolar plate assembly taken along line A-A in FIG. 1, showing multiple stacked frame members forming multiple seals in a bipolar plate assembly stack.

With reference to FIGS. 2-3, an embodiment of a bipolar plate assembly 100 is provided that includes a first frame member 105, a second frame member 110, a bipolar plate 115, and a membrane electrode assembly 120. The first frame member 105 includes a first side 125 and a second side 127, the first side 125 having a first side protuberance 130. The second frame member 110 includes a first side 135 and a second side 140, the second side 140 having a second side recess 145. The bipolar plate 115 includes an anode plate 150 and a cathode plate 155, a portion 160 of the anode plate 150 and a portion 165 of the cathode plate 155 disposed between the first frame member 105 and the second frame member 110. The membrane electrode assembly 120 includes a proton exchange membrane 170 disposed between an anode catalyst layer 175 and a cathode catalyst layer 180, where the membrane electrode assembly 120 is disposed adjacent one of the anode plate 150 and the cathode plate 155 of the bipolar plate 115. The first side protuberance 130 of the first frame member 105 deforms the portion 160 of the anode plate 150 and the portion 165 of the cathode plate 155 into the second side recess 145 of the second frame member 110, thereby forming a seal 185 therebetween.

As shown in FIGS. 2-3, the portion 160 of the anode plate 150 and the portion 165 of the cathode plate 155 disposed between the first frame member 105 and the second frame member 110 can be at an edge 190 of the bipolar plate assembly 100, as defined by line A-A in FIG. 1. A portion 195 of the proton exchange membrane 170, furthermore, can be disposed between the first frame member 105 and the second frame member 110 at the edge 190 of the bipolar plate assembly 100. In this way, the first side protuberance 130 of the first frame member 105 can contact and deform the portion 195 of the proton exchange membrane 170, which in turn can contact and deform the portion 160 of the anode plate 150, which in turn can contact and deform the portion 165 of the cathode plate 155 into the second side recess 145 of the second frame member 110, thereby forming the seal 185 therebetween.

The first frame member 105 can include a second side protuberance 200 and a third frame member 205 can include a first side recess 210. The second side protuberance 200 of the first frame member 105 can contact and deform a portion 213 of a second cathode plate 215, which can contact and deform a portion 220 of a second anode plate 225 into the first side recess 210 of the third frame member 205, thereby forming a seal 207 therebetween. As illustrated with respect to the first frame member 105, the second frame member 110, and the third frame member 205, successive frames can be added to the bipolar plate assembly 100 to form a fuel cell stack including multiple bipolar plate assemblies 100.

Figure 4:
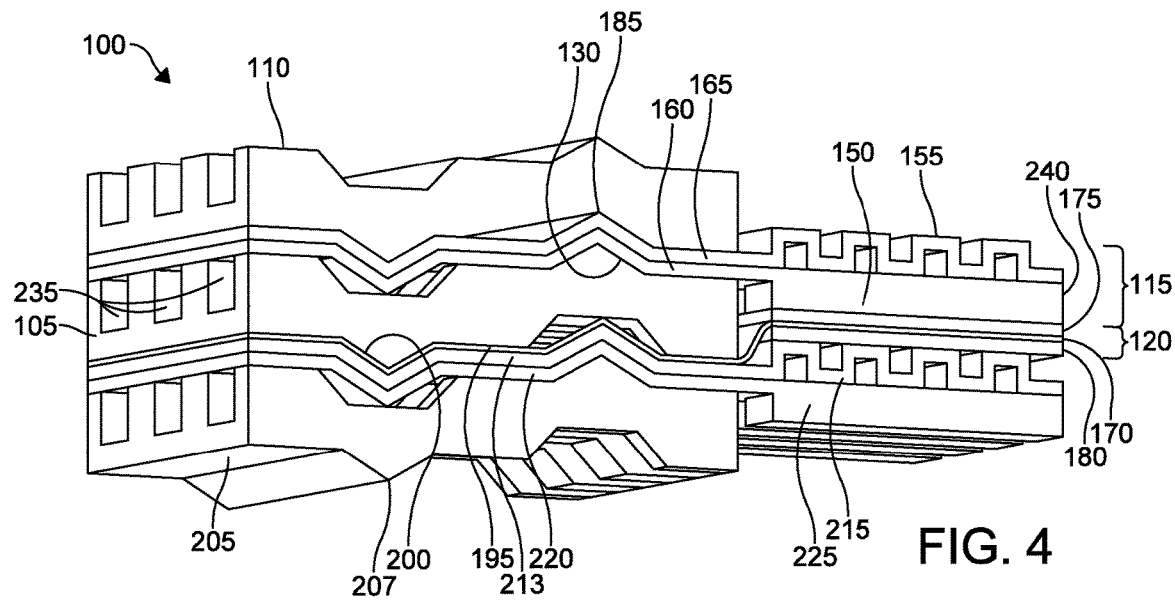
FIG. 4 is a partial bottom perspective view of an anode header of the bipolar plate assembly taken along line B-B in FIG. 1.
Figure 5:
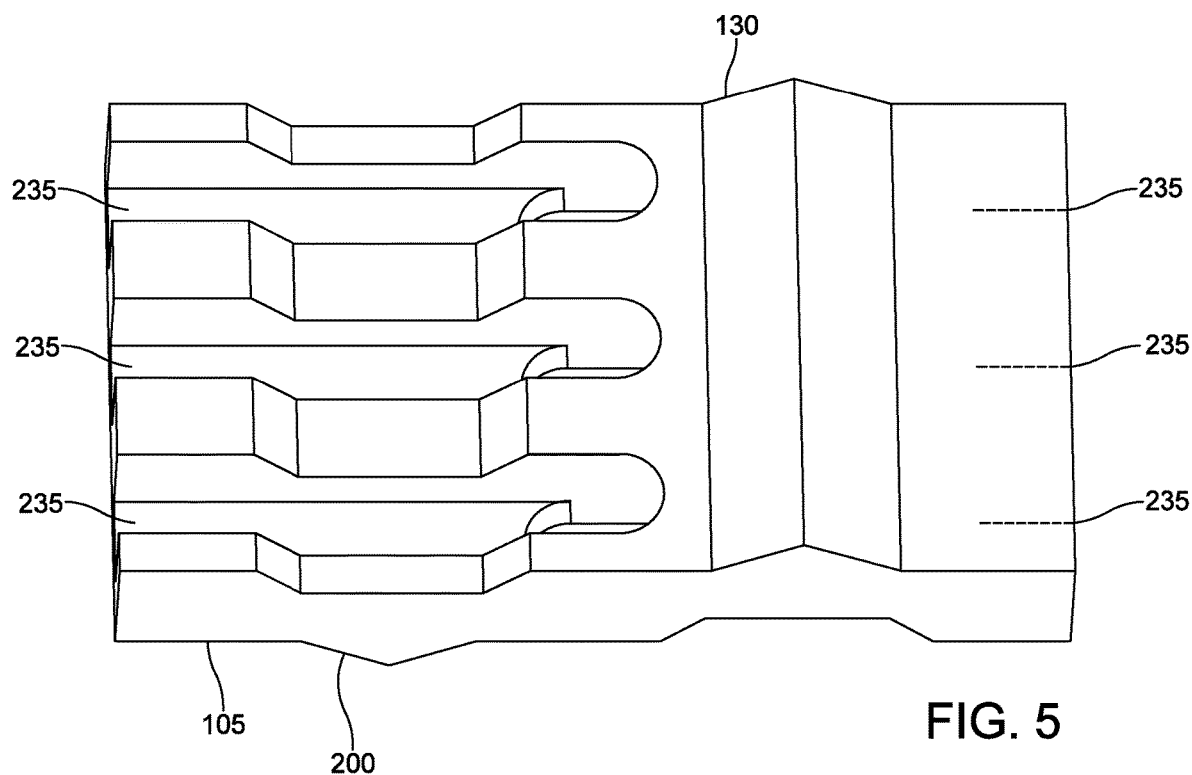
FIG. 5 is a partial top perspective view of a frame member of the anode header of the bipolar plate assembly structure in FIG. 4.

With reference to FIGS. 4-5, another embodiment of a bipolar plate assembly 100 is provided where the portion 160 of the anode plate 150 and the portion 165 of the cathode plate 155 disposed between the first frame member 105 and the second frame member 110 are at an anode header 230 of the bipolar plate assembly 100, as defined by line B-B in FIG. 1. The first side protuberance 130 of the first frame member 105 can contact and deform the portion 160 of the anode plate 150, which can contact and deform the portion 165 of the cathode plate 155 into the second side recess 145 of the second frame member 110, thereby forming the seal 185 therebetween. The first frame member 105 can include an anode channel 235 fluidly coupling the anode header 230 and an anode flow field 240 positioned between the anode plate 150 and the anode catalyst layer 175 on the proton exchange membrane 170.

A portion 195 of the proton exchange membrane 170 can be disposed between the first frame member 105 and a third frame member 205 at the anode header 230 of the bipolar plate assembly 100. The first frame member 105 can include a second side protuberance 200 and a third frame member 205 can include a first side recess 210. The second side protuberance 200 of the first frame member 105 can contact and deform the portion 195 of the proton exchange membrane 170, which in turn can contact and deform a portion of a second cathode plate 215, which in turn can contact and deform a portion 213 of a second anode plate 225 into the first side recess 210 of the third frame member 205, thereby forming a seal 207 therebetween.

Figure 6:
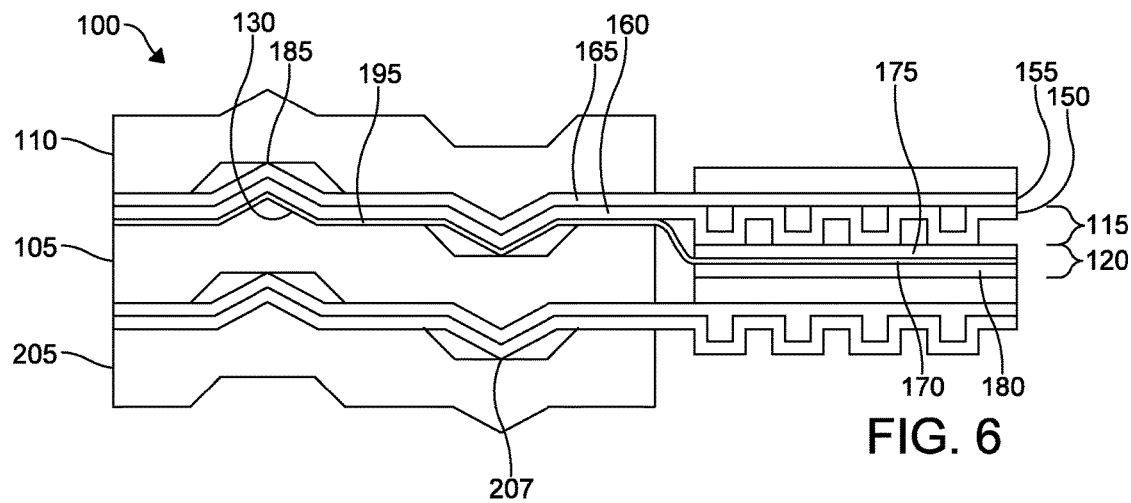
FIG. 6 is a partial cross-sectional view of a cathode header of the bipolar plate assembly taken along line C-C in FIG. 1.
Figure 7:
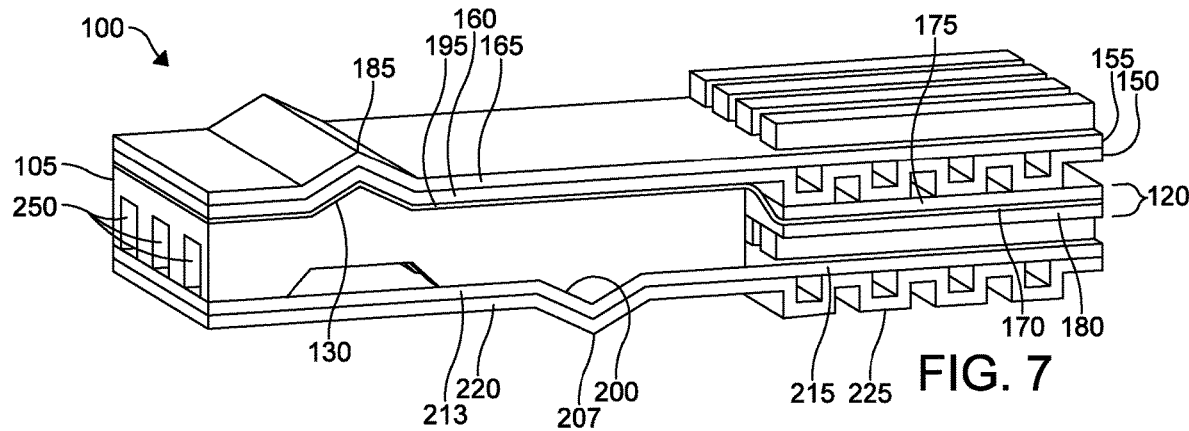
FIG. 7 is a partial top perspective view of the cathode header of the bipolar plate assembly structure in FIG. 6.
Figure 8:
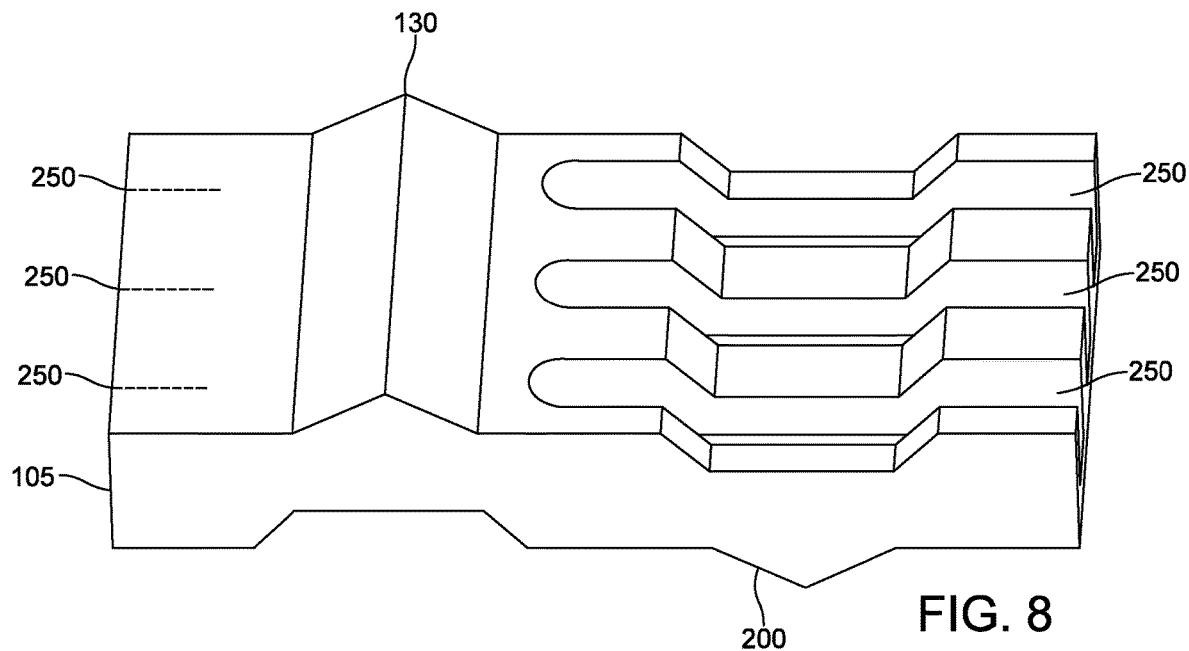
FIG. 8 is a partial top perspective view of a frame member of the cathode header of the bipolar plate assembly structure in FIG. 6.

With reference to FIGS. 6-8, another embodiment of a bipolar plate assembly 100 is provided where the portion 160 of the anode plate 150 and the portion 165 of the cathode plate 155 disposed between the first frame member 105 and the second frame member 110 can be at a cathode header 245 of the bipolar plate assembly 100, as defined by line C-C in FIG. 1. A portion 195 of the proton exchange membrane 170 can be disposed between the first frame member 105 and the second frame member 110 at the cathode header 245 of the bipolar plate assembly 100. The first side protuberance 130 of the first frame member 105 can contact and deform the portion 195 of the proton exchange membrane 170, which can contact and deform the portion 160 of the anode plate 150, which can contact and deform the portion 165 of the cathode plate 155 into the second side recess 145 of the second frame member 110, thereby forming the seal 185 therebetween. The first frame member 105 can include a cathode channel 250 fluidly coupling the cathode header 245 and a cathode flow field 255 positioned between the cathode plate 155 and the cathode catalyst layer 180 on the proton exchange membrane 170.

The first frame member 105 can include a second side protuberance 200 and a third frame member 205 can include a first side recess 210. The second side protuberance 200 of the first frame member 105 can contact and deform a portion of a second cathode plate 215, which can contact and deform a portion 220 of a second anode plate 225 into the first side recess 210 of the third frame member 205, thereby forming a seal 207 therebetween.

Figure 9:
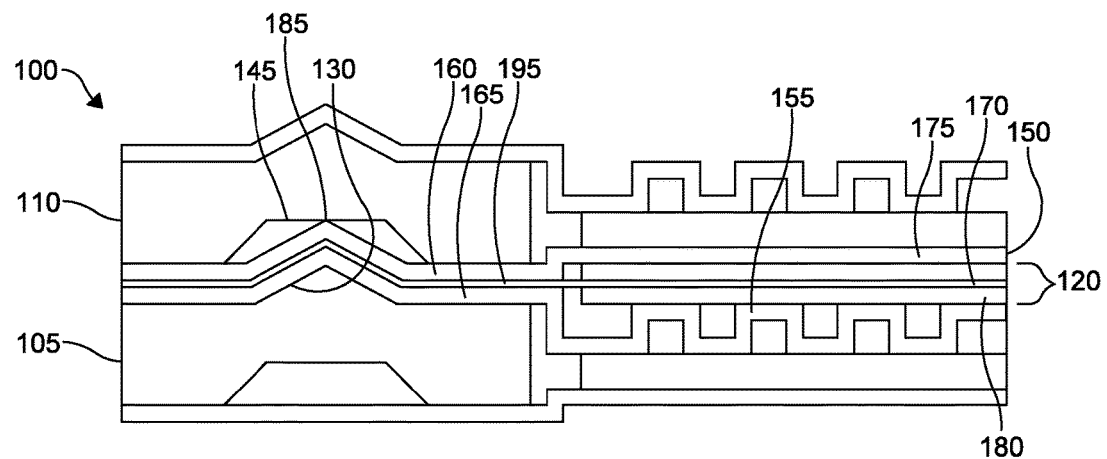
FIG. 9 is a partial cross-sectional view of a coolant header of the bipolar plate assembly taken along line D-D in FIG. 1.
Figure 10:
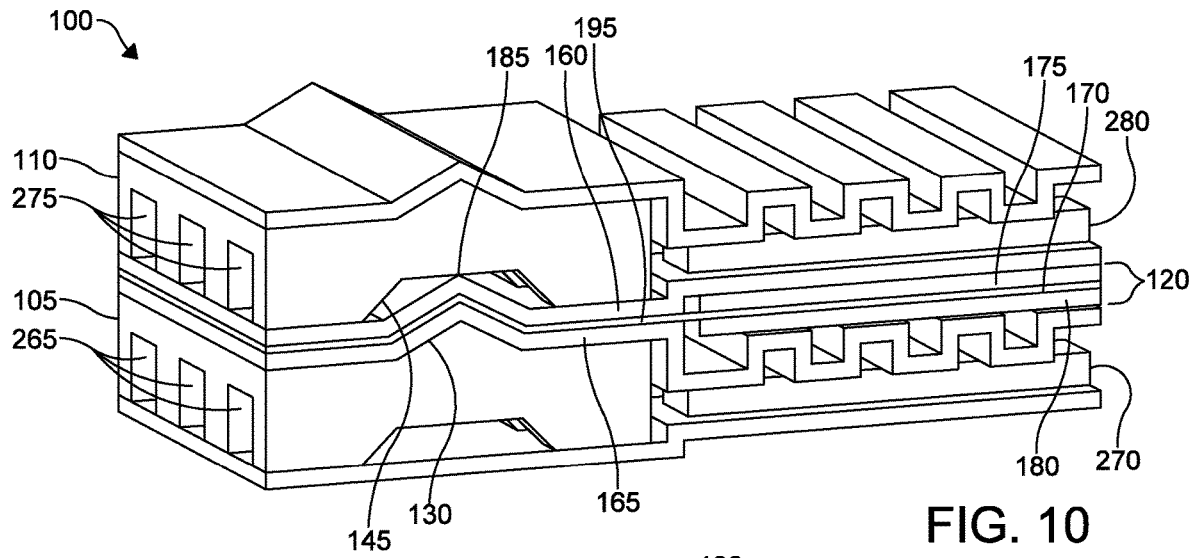
FIG. 10 is a partial top perspective view of the coolant header of the bipolar plate assembly structure in FIG. 9.
Figure 11:
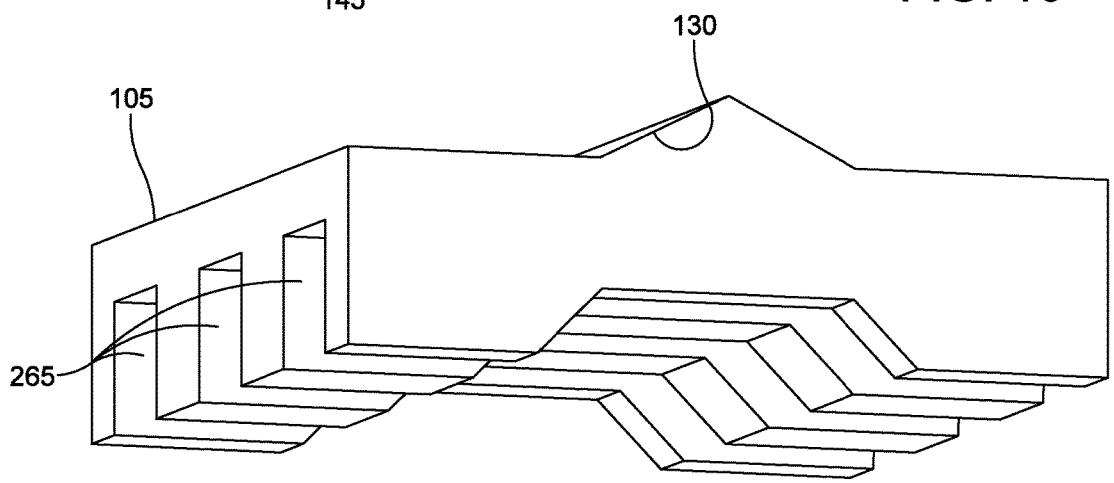
FIG. 11 is a partial bottom perspective view of a frame member of the coolant header of the bipolar plate assembly structure in FIG. 9.

With reference to FIGS. 9-11, another embodiment of a bipolar plate assembly 100 is provided where the portion 160 of the anode plate 150 and the portion 165 of the cathode plate 155 disposed between the first frame member 105 and the second frame member 110 are at a coolant header 260 of the bipolar plate assembly 100, as defined by line D-D in FIG. 1. A portion 195 of the proton exchange membrane 170 is disposed between the first frame member 105 and the second frame member 110 at the coolant header 260 of the bipolar plate assembly 100. The first side protuberance 130 of the first frame member 105 can contact and deform the portion 165 of the cathode plate 155, which can contact and deform the portion 195 of the proton exchange membrane 170, which can contact and deform the portion 160 of the anode plate 150 into the second side recess 145 of the second frame member 110, thereby forming the seal 185 therebetween. The first frame member 105 can include a first coolant channel 265 fluidly coupling the coolant header 260 and a first coolant flow field 270, the first coolant flow field 270 in thermal communication with the cathode plate 155. The second frame member 110 can include a second coolant channel 275 fluidly coupling the coolant header 260 and a second coolant flow field 280, the second coolant flow field 280 in thermal communication with the anode plate 150.

With reference to FIGS. 12-19, another embodiment of a bipolar plate assembly 100 is provided where a first frame member 105 can include a first side 125 and a second side 127, the first side 125 having a first side protuberance 130 and a first side recess 285. A second frame member 110 can include a first side 135 and a second side 140, the second side 140 having a second side recess 145 and a second side protuberance 290. A bipolar plate 115 can include an anode plate 150 and a cathode plate 155, a portion 165 of the cathode plate 155 can be disposed between the first frame member 105 and the second frame member 110. A membrane electrode assembly 120 can include a proton exchange membrane 170 disposed between an anode catalyst layer 175 and a cathode catalyst layer 180. The membrane electrode assembly 120 can be disposed adjacent one of the anode plate 150 and the cathode plate 155 of the bipolar plate 115, where a portion 195 of the proton exchange membrane 170 can be disposed between the first frame member 105 and the second frame member 110. The first side protuberance 130 of the first frame member 105 can deform the portion 195 of the proton exchange membrane 170 and the portion 165 of the cathode plate 155 into the second side recess 145 of the second frame member 110, thereby forming a seal 185 therebetween. The second side protuberance 290 of the second frame member 110 can deform the portion 165 of the cathode plate 155 and the portion 195 of the proton exchange membrane 170 into the first side recess 285 of the first frame member 105, thereby forming another seal 207 therebetween.

Certain embodiments include where the cathode flow field 255 is configured using micro-channel technology.

The first side protuberance 130 of the first frame member 105 can contact and deform the portion 195 of the proton exchange membrane 170, which in turn can contact and deform the portion 165 of the cathode plate 155 into the second side recess 145 of the second frame member 110, thereby forming the seal 185 therebetween. The second side protuberance 290 of the second frame member 110 can contact and deform the portion 165 of the cathode plate 155, which in turn can contact and deform the portion 195 of the proton exchange membrane 170 into the first side recess 285 of the first frame member 105, thereby forming the another seal 207 therebetween.

Figure 12:
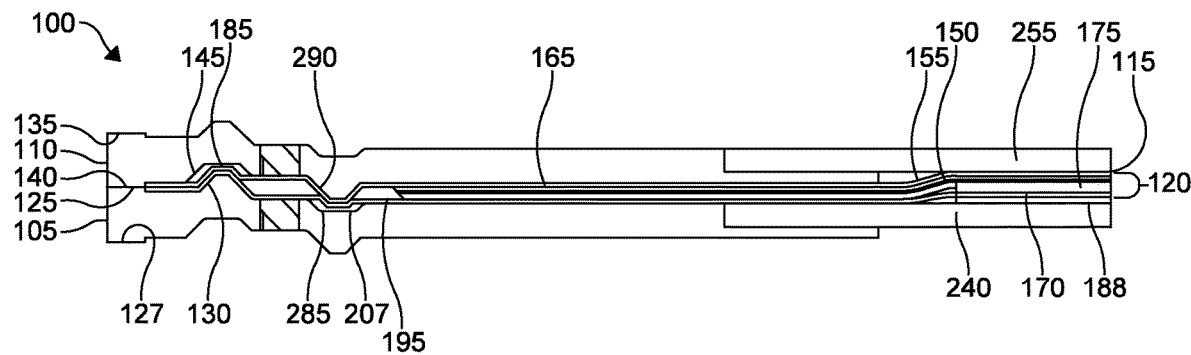
FIG. 12 is a partial cross-sectional view of an alternate embodiment of the bipolar plate, constructed in accordance with the present technology, showing cathode tunnels of frame members, where the cathode tunnels form part of cathode channels in the upper frame member fluidly coupling a cathode header and a cathode flow field.
Figure 13:
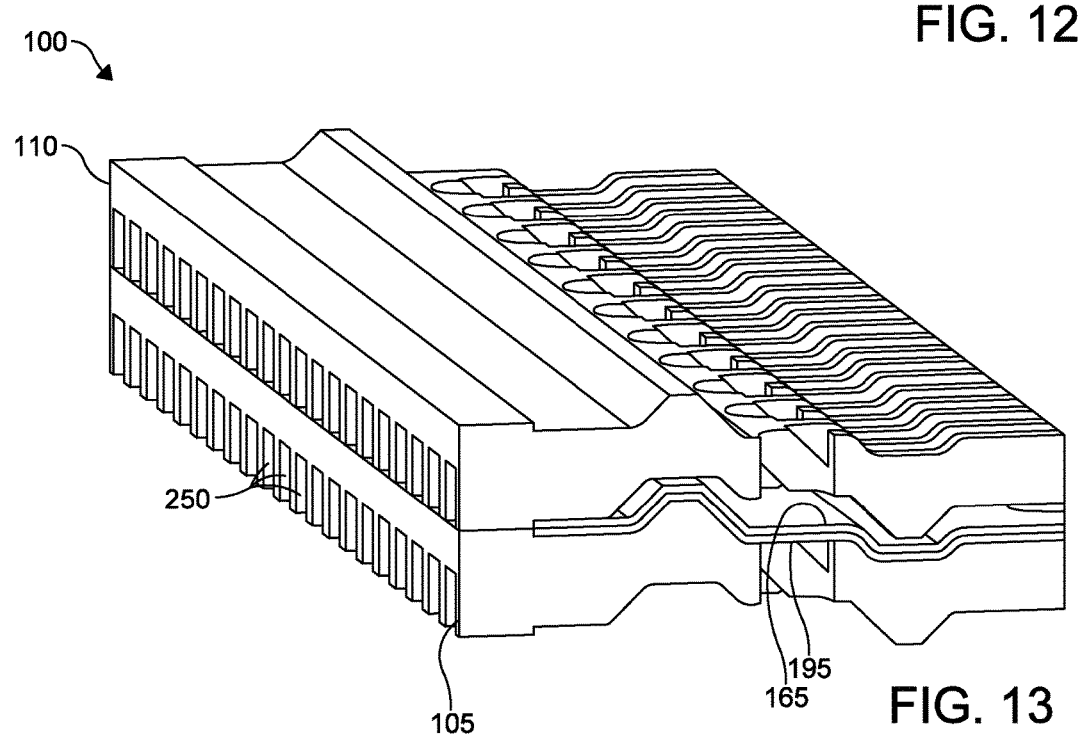
FIG. 13 is a partial isometric view of the bipolar plate assembly in FIG. 12 showing the cathode channels in the upper frame member fluidly coupling the cathode header and the cathode flow field.

With reference to FIGS. 12-13, the bipolar plate assembly 100 can be positioned relative to a cathode header 245, where a cathode channel 250 fluidly couples the cathode header 245 and a cathode flow field 255 positioned between the cathode plate 155 and the cathode catalyst layer 180, as defined by line C-C in FIG. 1. The first frame member 105 can include a cathode channel 250 fluidly coupling the cathode header 245 and a cathode flow field 255 positioned between the cathode plate 155 and the cathode catalyst layer 180.

Figure 14:
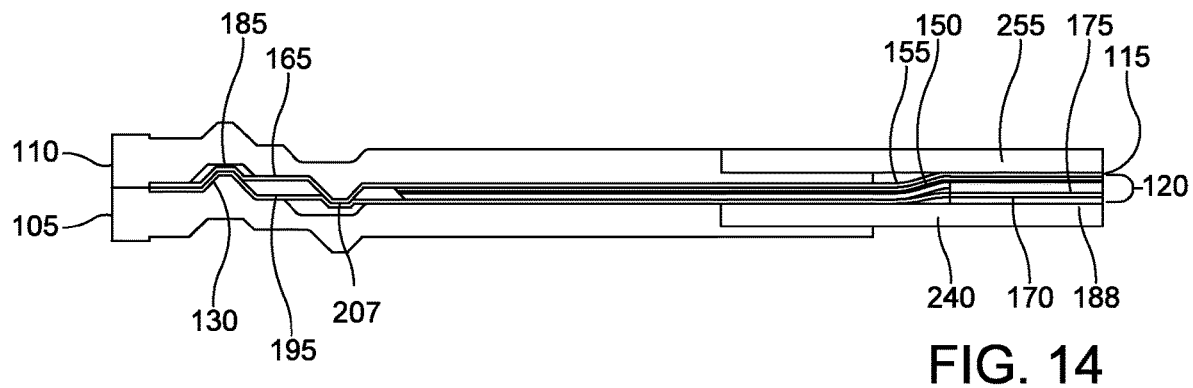
FIG. 14 is a partial cross-sectional view of the bipolar plate assembly of FIG. 12, showing anode channels in the lower frame member fluidly coupling an anode header and an anode flow field.
Figure 15:
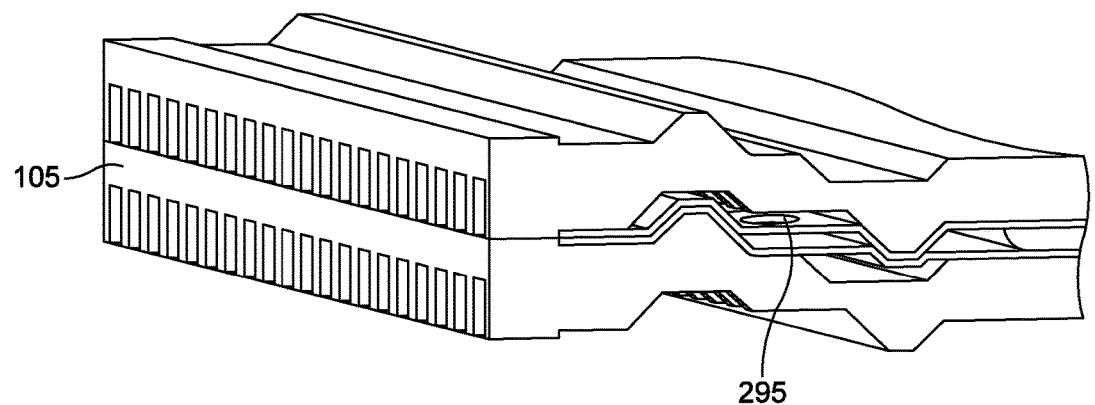
FIG. 15 is a partial isometric view of the bipolar plate assembly in FIG. 12, showing anode channels in the lower frame member fluidly coupling the anode header and the anode flow field, and the upper frame member includes cathode channels cooperating with apertures in a cathode plate to fluidly couple the cathode header and the cathode flow field.
Figure 16:
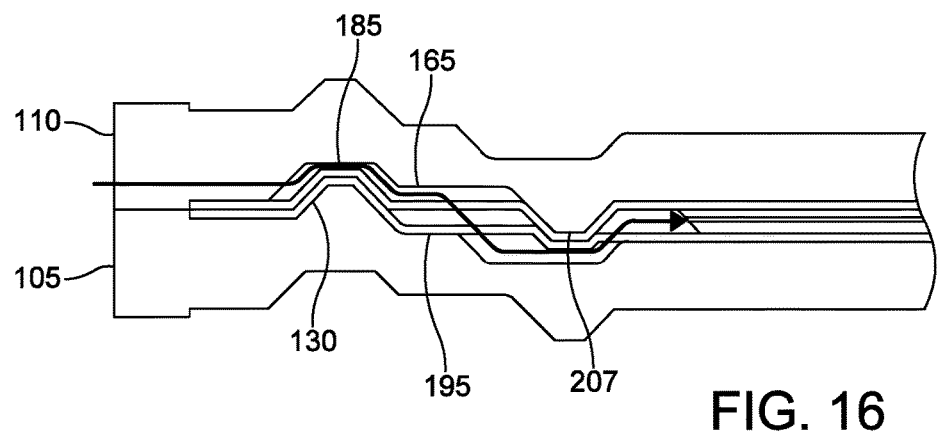
FIG. 16 is partial cross-sectional view of the bipolar plate assembly in FIG. 12, showing anode channels in the lower frame member fluidly coupling an anode header and an anode flow field, further depicting anode channel flow.

With reference to FIGS. 14-16, the bipolar plate assembly 100 can be positioned relative to an anode header 230, where an anode channel 235 fluidly couples the anode header 230 and an anode flow field 240 positioned between the anode plate 150 and the anode catalyst layer 175, as defined by line B-B in FIG. 1. The first frame member 105 can include an anode channel 235 fluidly coupling the anode header 230 and an anode flow field 240 positioned between the anode plate 150 and the anode catalyst layer. The cathode plate 155 can include an aperture 295 between the seal 185 and the another seal 207 that cooperates with the cathode channel 250 in fluidly coupling the cathode header 245 and the cathode flow field 255.

Figure 17:
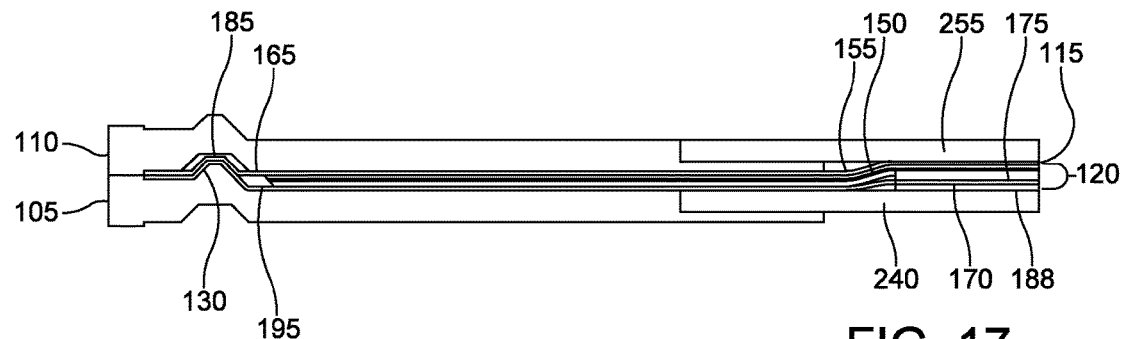
FIG. 17 is a partial cross-sectional view of the bipolar plate assembly of FIG. 12, showing coolant channels from a coolant header.
Figure 18:
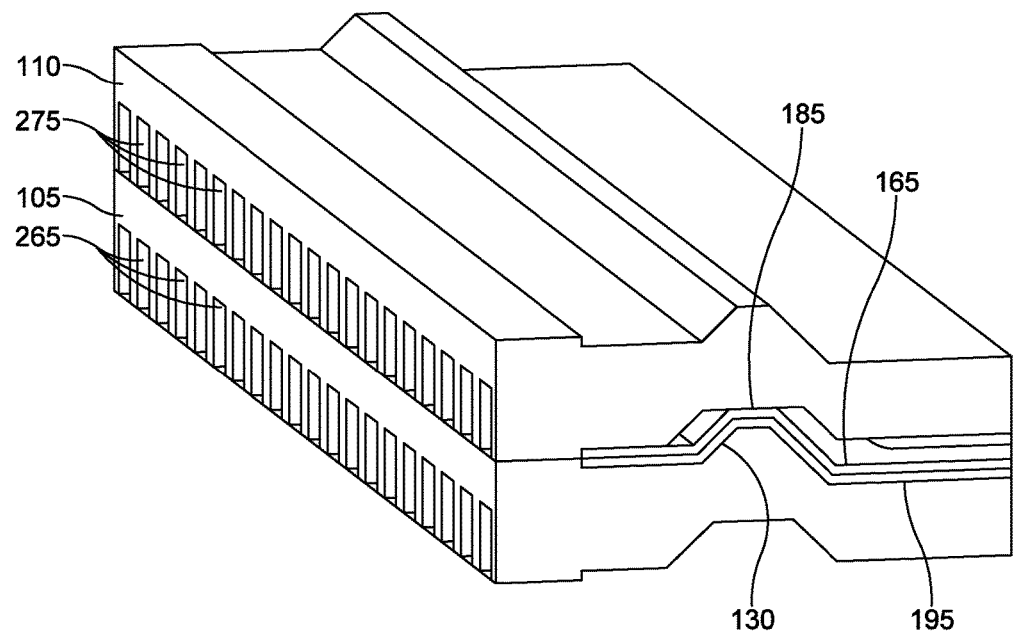
FIG. 18 is a partial isometric view of the bipolar plate assembly of FIG. 12, showing coolant channels from a coolant header.

With reference to FIGS. 17-18, the bipolar plate assembly 100 can be positioned relative to a coolant header 260, where a first coolant channel 265 fluidly couples the coolant header 260 and a first coolant flow field 270 and a second coolant channel 275 fluidly couples the coolant header 260 and a second coolant flow field 280, as defined by line D-D in FIG. 1. The first frame member 105 can include a first coolant channel 265 fluidly coupling the coolant header 260 and a first coolant flow field 270. The second frame member 110 can include a second coolant channel 275 fluidly coupling the coolant header 260 and a second coolant flow field 280.

Figure 19:
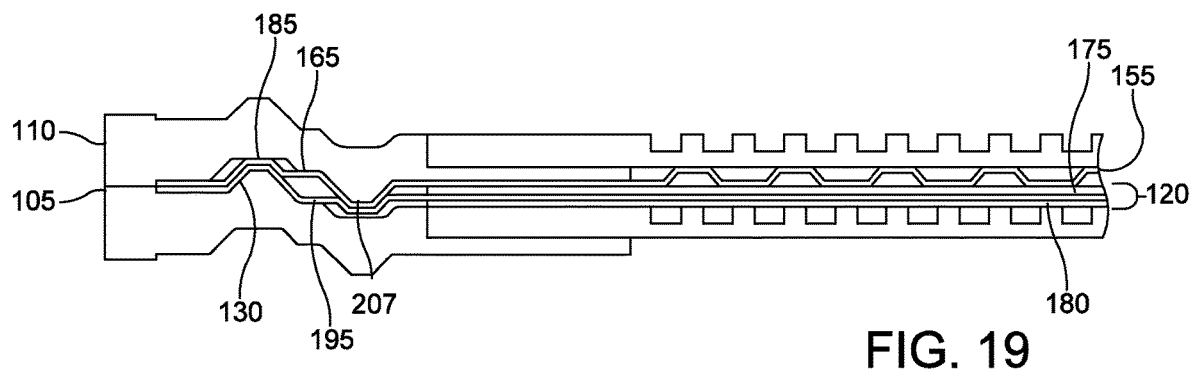
FIG. 19 is a partial cross-sectional view of the bipolar plate assembly of FIG. 12, showing coolant channels from an edge of the bipolar plate assembly.

With reference to FIG. 19, the bipolar plate assembly 100 can be positioned relative to an edge 190, as defined by line A-A in FIG. 1.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods can be made within the scope of the present technology, with substantially similar results.

What is claimed is:

1. A bipolar plate assembly comprising:
   a first frame member including a first side and a second side, the first side having a first side protuberance;
   a second frame member including a first side and a second side, the second side having a second side recess;
   a bipolar plate including an anode plate and a cathode plate, a portion of the anode plate and a portion of the cathode plate disposed between the first frame member and the second frame member;
   a membrane electrode assembly including a proton exchange membrane disposed between an anode catalyst layer and a cathode catalyst layer, the membrane electrode assembly disposed adjacent one of the anode plate and the cathode plate of the bipolar plate;
   wherein the first side protuberance of the first frame member deforms the portion of the anode plate and the portion of the cathode plate into the second side recess of the second frame member, thereby forming a seal therebetween.

2. The bipolar plate assembly of claim 1, wherein the first frame member includes a second side recess and the second frame member includes a first side protuberance.

3. The bipolar plate assembly of claim 2, wherein the first frame member includes a first side recess and the second frame member includes a second side protuberance.

4. The bipolar plate assembly of claim 3, wherein the first frame member includes a second side protuberance and the second frame member includes a first side recess.

5. The bipolar plate assembly of claim 4, wherein the first frame member and the second frame member have substantially a same structure.

6. The bipolar plate assembly of claim 1, wherein
the first frame member includes a first side recess;
the second frame member includes second side protuberance; and
wherein the second side protuberance of the second frame member deforms the portion of the anode plate and the portion of the cathode plate into the first side recess of the first frame member, thereby forming another seal therebetween.

7. The bipolar plate assembly of claim 1, wherein the first frame member and the second frame member comprise plastic and are electrically nonconductive.

8. The bipolar plate assembly of claim 1, wherein the first side protuberance of the first frame member is deformed in forming the seal.

9. The bipolar plate assembly of claim 1, wherein the first side protuberance of the first frame member has one of a substantially trigonal cross-section and a substantially frustoconical cross-section.

10. The bipolar plate assembly of claim 1, wherein each of the first frame member and the second frame member includes:
a plurality of edges, each edge substantially congruent with an edge of the bipolar plate assembly;
an anode header;
a cathode header; and
a coolant header.

11. The bipolar plate assembly of claim 1, wherein each of the first frame member and the second frame member is substantially congruent with a perimeter of the bipolar plate assembly, substantially circumscribes the membrane electrode assembly, and the anode catalyst layer and the cathode catalyst layer are disposed within an open interior portion thereof.

12. The bipolar plate assembly of claim 1, wherein:
the portion of the anode plate and the portion of the cathode plate disposed between the first frame member and the second frame member are at an edge of the bipolar plate assembly;
a portion of the proton exchange membrane is disposed between the first frame member and the second frame member at the edge of the bipolar plate assembly; and
the first side protuberance of the first frame member contacts and deforms the portion of the proton exchange membrane, which contacts and deforms the portion of the anode plate, which contacts and deforms the portion of the cathode plate into the second side recess of the second frame member, thereby forming the seal therebetween.

13. The bipolar plate assembly of claim 12, wherein:
wherein the first frame member includes a second side protuberance and a third frame member includes a first side recess; and
the second side protuberance of the first frame member contacts and deforms a portion of a second cathode plate, which contacts and deforms a portion of a second anode plate into the first side recess of the third frame member, thereby forming a seal therebetween.

14. The bipolar plate assembly of claim 1, wherein:
the portion of the anode plate and the portion of the cathode plate disposed between the first frame member and the second frame member are at an anode header of the bipolar plate assembly;
the first side protuberance of the first frame member contacts and deforms the portion of the anode plate, which contacts and deforms the portion of the cathode plate into the second side recess of the second frame member, thereby forming the seal therebetween; and
the first frame member including an anode channel fluidly coupling the anode header and an anode flow field positioned between the anode plate and the anode catalyst layer.

15. The bipolar plate assembly of claim 14, wherein:
a portion of the proton exchange membrane is disposed between the first frame member and a third frame member at the anode header of the bipolar plate assembly;
wherein the first frame member includes a second side protuberance and a third frame member includes a first side recess; and
the second side protuberance of the first frame member contacts and deforms the portion of the proton exchange membrane, which contacts and deforms a portion of a second cathode plate, which contacts and deforms a portion of a second anode plate into the first side recess of the third frame member, thereby forming a seal therebetween.

16. The bipolar plate assembly of claim 1, wherein:
the portion of the anode plate and the portion of the cathode plate disposed between the first frame member and the second frame member are at a cathode header of the bipolar plate assembly;
a portion of the proton exchange membrane is disposed between the first frame member and the second frame member at the cathode header of the bipolar plate assembly;
the first side protuberance of the first frame member contacts and deforms the portion of the proton exchange membrane, which contacts and deforms the portion of the anode plate, which contacts and deforms the portion of the cathode plate into the second side recess of the second frame member, thereby forming the seal therebetween; and
the first frame member including a cathode channel fluidly coupling the cathode header and a cathode flow field positioned between the cathode plate and the cathode catalyst layer.

17. The bipolar plate assembly of claim 16, wherein:
the first frame member includes a second side protuberance and a third frame member includes a first side recess;
the second side protuberance of the first frame member contacts and deforms a portion of a second cathode plate, which contacts and deforms a portion of a second anode plate into the first side recess of the third frame member, thereby forming a seal therebetween.

18. The bipolar plate assembly of claim 1, wherein:
the portion of the anode plate and the portion of the cathode plate disposed between the first frame member and the second frame member are at a coolant header of the bipolar plate assembly;
a portion of the proton exchange membrane is disposed between the first frame member and the second frame member at the coolant header of the bipolar plate assembly;
the first side protuberance of the first frame member contacts and deforms the portion of the cathode plate, which contacts and deforms the portion of the proton exchange membrane, which contacts and deforms the portion of the anode plate into the second side recess of the second frame member, thereby forming the seal therebetween;

the first frame member including a first coolant channel fluidly coupling the coolant header and a first coolant flow field, the first coolant flow field in thermal communication with the cathode plate; and the second frame member including a second coolant channel fluidly coupling the coolant header and a second coolant flow field, the second coolant flow field in thermal communication with the anode plate.

19. A bipolar plate assembly comprising:

a first frame member including a first side and a second side, the first side having a first side protuberance and a first side recess;

a second frame member including a first side and a second side, the second side having a second side recess and a second side protuberance;

a bipolar plate including an anode plate and a cathode plate, a portion of the cathode plate disposed between the first frame member and the second frame member;

a membrane electrode assembly including a proton exchange membrane disposed between an anode catalyst layer and a cathode catalyst layer, the membrane electrode assembly disposed adjacent one of the anode plate and the cathode plate of the bipolar plate, a portion of the proton exchange membrane disposed between the first frame member and the second frame member, wherein the first side protuberance of the first frame member contacts and deforms the portion of the proton exchange membrane, which contacts and deforms the portion of the cathode plate into the second side recess of the second frame member, thereby forming a seal therebetween, wherein the second side protuberance of the second frame member contacts and deforms the portion of the cathode plate, which contacts and deforms the portion of the proton exchange membrane into the first side recess of the first frame member, thereby forming the another seal therebetween, and wherein the first frame member includes a fluid channel fluidly coupling an fluid header and an fluid flow field positioned between one of the anode plate and the cathode plate and one of the anode catalyst layer and the cathode catalyst layer, wherein the cathode plate includes an aperture between the seal and the another seal that cooperates with the cathode channel in fluidly coupling the cathode header and the cathode flow field.

20. A method of assembling a bipolar plate assembly, the method comprising:

providing a bipolar plate assembly according to claim 1; and deforming the portion of the anode plate and the portion of the cathode plate into the second side recess of the second frame member with the first side protuberance of the first frame member, thereby forming the seal therebetween.

* * * * *